United States Patent Office 3,440,228
Patented Apr. 22, 1969

3,440,228
MODIFIED POLYMERS HAVING RECURRING N-SUBSTITUTED ANTHRANYL SIDE GROUPS
Louis A. Errede, Roseville, Minn., assignor to Minnesota Mining and Manufacturing Company, St. Paul, Minn., a corporation of Delaware
No Drawing. Original application Jan. 6, 1964, Ser. No. 336,033. Divided and this application Apr. 17, 1967, Ser. No. 645,083
Int. Cl. C09d 3/48; C08f 45/46
U.S. Cl. 260—78              12 Claims

ABSTRACT OF THE DISCLOSURE

Polymeric materials having suitably reactive recurring groups, such as hydroxyls and groups hydrolyzable to hydroxyls, are reacted with anthranyls to form recurring carboxy-linked N-substituted anthranyl side groups thereon. At the time they are reacted with the anthranyls the polymeric precursors are either dispersed in a solvent or are in solid form (e.g. paper, cloth, etc.). The polymers of the invention, whether prepared from solvent dispersed or solid precursor polymers, are more heat resistant, stiffer, stronger and more water resistant than the precusor polymers. In addition, the polymers which contain recurring perfluoroalkyl groups in the side chains also have oil repellence properties.

This is a division of application Ser. No. 336,033 filed Jan. 6, 1964, now United States Patent 3,357,977.

This invention relates to a novel and useful class of polymers and more specifically to polymers having anthraylate groups attached to the main chain of the polymer.

It is an object of the present invention to provide a novel and useful class of polymers. It is another object of the invention to provide a process for the preparation of these polymers. It is another object of the invention to provide certain intermediates of polymers of the invention. It is another object of the invention to provide a process for the preparation of certain intermediates of polymers of the invention. Still other objects will become apparent to those skilled in the art from reading the specification which follows.

The polymers of the invention have saturated carbon-carbon main chains which may or may not also contain recurring ether oxygen atoms therein and recurring side groups thereon selected from hydroxyl groups, groups hydrolyzable to hydroxyl groups and anthranylic groups, at least 5 percent of the total polymer weight being accounted for by anthranylic groups.

A particularly preferred class of polymers of the invention are those having anthranylic side groups of the formula:

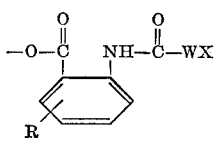

wherein W is a single bond, $(CH_2)_q$,

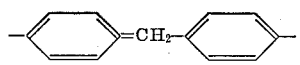

or phenylene; X is $C_mH_{2m+1}$, $C_nF_{2n+1}$, $NH_2$, $NO_2$,

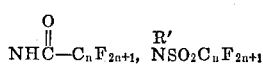

or

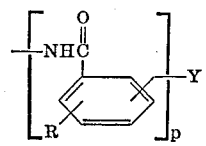

Y is hydrogen or

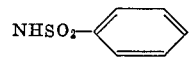

R' is hydrogen or an alkyl group containing up to 6 carbon atoms; R is hydrogen, nitro or halogen; and $m$ is 0–18, $n$ is 1–12, $p$ is 1–20 and $q$ is 1–18, provided that $m+q$ is not greater than 18. The anthranylic side groups in these polymers appear to render them thermoplastic and to impart thermal stability and additional strength thereto. The anthranylic side groups preferably have molecular weights no greater than about $4 \times 10^3$. In cases where the anthranyl side groups contain perfluoroalkyl radicals, oil and water repellence are also imparted to the polymers. The preferred polymers of the invention comprise from about 10 to 80 weight percent of anthranyl side group.

The preferred polymers of the invention are prepared by interreacting an anthranyl having the formula:

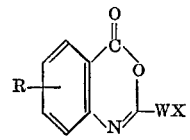

wherein R, W and X are as previously defined, and a polymer having a saturated carbon-carbon main chain which might or might not also contain recurring ether oxygen atoms and containing a plurality of hydroxyl groups or groups hydrolyzable to hydroxyl groups along its chain and recovering said polymers.

The precursor polymer is contacted with a solution of the anthranyl in a solvent that contains no hydrogen which is reactive toward the anthranyl under the conditions of the reaction. Among the solvents which can be used to dissolve the anthranyls are dimethylformamide, dimethylsulfoxide, pyridine, anhydrous ketones such as acetone and methyl ethyl ketone, etc.

The reaction is preferably carried out at from about 60°–150° C. At temperatures below this range, the reaction is unnecessarily slow while at higher temperatures the reactants often begin to degrade. The reaction time is normally from about 1–10 hours. In some cases a small amount of an alkali metal lower alkoxide (e.g. sodium methoxide, potassium butoxide, etc.) is added to promote the reaction. Anywhere from about .05 to 1.0 mole of the alkoxide, based on the number of reactive groups on the polymer, is ordinarily added to the polymer either before or at the same time it is mixed with the anthranyl.

At the time of its reaction with the anthranyl, the polymer precursor is either dispersed (as a gel or solution) in a solvent of the type used to dissolve the anthranyl (ordinarily the same solvent) or is in solid form (e.g. paper, cloth, etc.). In the former case the polymer precursor itself is usually first dispersed in the solvent and the solution of the anthranyl is then added. The reaction proceeds, a clear, viscous solution being formed. The product is recovered by slow addition of the reaction mixture to an excess of a second liquid in which the solvent but not the solute is soluble. The preferred second liquid is water. The product can then be dried and pressed, molded or spun into useful films, rods or fibers, as desired.

If the precursor polymer is to be maintained in solid form throughout the reaction, it is simply placed in the anthranyl solution to react and is then removed and dried. In this case, the reaction takes place primarily on the surface of the solid object and the use of the alkali metal lower alkoxide is particularly desirable.

Another facet of the invention relates to a class of novel anthranyl compounds which are intermediates in the preparation of certain of the polymers of the invention. These compounds have the formula:

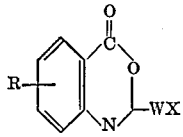

wherein W is a single bond, $(CH_2)_q$, phenylene or

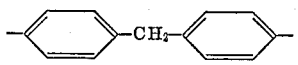

X is $-C_nF_{2n+1}$, $-NH\overset{O}{\overset{\|}{C}}-C_nF_{2n+1}$, $-\overset{R'}{N}SO_2C_nF_{2n+1}$ or

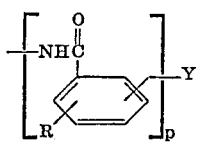

Y is hydrogen or

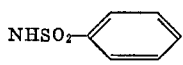

R' is hydrogen or an alkyl group containing up to 6 carbon atoms;
R is hydrogen, nitro or halogen;
$n$ is 1–12, $p$ is 1–20 and $q$ is 1–18.

The anthranyl used in preparing polymers of the invention are available by processes and in examples described in detail in the parent case U.S. Patent 3,357,977 here incorporated by reference.

Examples of suitable polymer precursers are polyvinyl alcohol, starch, methocel, cellulose (e.g. cotton cloth, paper, non-woven fabrics), cellulose acetate, hydrolyzed copolymers of vinyl acetate and styrene, copolymers of styrene and allyl alcohol, etc. In addition, polypropylene oxides and polyethylene oxides with terminal hydroxyl groups can be chain extended by the use of bifunctional acetylanthranyl, bis-benzoylanthranyl ether, benz bis-acetylanthraanyl, bis- benzoylanthranyl ether, benz bis-acetylanthranyl, etc. Preformed materials such as polyamides, leather, hides, etc. can also be modified by reaction with acylanthranyls.

Among the anthranyls which are suitable for use in the present invention are:

acetylanthranyl,
propionylanthranyl,
butyrylanthranyl,
caproylanthranyl,
lauroylanthranyl,
palmitoylanthranyl,
stearoylanthranyl,
5-bromo-acetylanthranyl,
6-nitroacetylanthranyl,
pedfluoroacetylanthranyl,
perfluorooctanoylanthranyl,
perfluoromyristoylanthranyl,
benzoylanthranyl,
6-nitrobenzoylanthranyl,
p-nitrobenzoylanthranyl,
p-aminobenzoylanthranyl,
m-nitrobenzoylanthranyl,
o-perfluorooctanamidobenzoylanthranyl,
N-ethyl,
N-perfluorooctanesulfonamidoacetylanthranyl,
linear-o-benzenesulfonamido-di-o-benzamidobenzoyl-anthranyl,
linear-o-benzenesulfonamido-ter-o-benzamidobenzoyl-anthranyl,
linear-o-benzenesulfonamido-deca-o-benzamidobenzoyl-anthranyl,
o-benzamidobenzoylanthranyl,
linear di-o-benzamidobenzoylanthranyl,
linear tetra-o-benzamidobenzoylanthranyl,
linear hepta-o-benzamidobenzoylanthranyl,
linear deca-o-benzamidobenzoylanthranyl,
6-(p-benzamidobenzyl) benzoylanthranyl, etc.

The preparations of many of these compounds are given hereinafter. Other anthranyls having structures similar to these illustrative compounds are prepared using analogous processes.

The polymers of the invention of which the precursor polymers are solvent dispersed during their preparation (and which therefore contain a relatively uniform concentration of anthranyl groups throughout) are in general thermoplastic materials which can be pressed or cast into useful films, spun into useful fibers or molded into articles. Their properties vary depending upon the nature of the precursor polymer and the anthranylate side groups and with the frequency of occurrence of the latter along the main chain of the polymer. Those polymers having relatively long side chains, e.g. those having repeating units in the side chains, can be considered to be graft copolymers. The addition of the anthranylate side groups greatly decreases the water sensitivity of the precursor polymer as well as its temperature sensitivity and also tends to stiffen and strengthen it. The solubility of the polymers in various solvents also varies widely, depending on the degree of modification of the precursor polymer by the side chains. The polymers which contain perfluoroalkyl groups have the additional property of being oil and water repellent.

The polymers of the invention of which the precursor polymers remain solid during their preparation have relatively uniform and complete replacement of the hydroxyls and groups hydrolyzable thereto on and near the surfaces of the solid structures by anthranyl groups ordinarily with less complete replacement deeper in the soilid structure. Thus the major effects of the anthranyl treatment of such solid structures frequently relate to surface properties such as water and oil repellence as well as some increase in stiffness, strength, heat resistance, etc.

This is not necessarily true, however, since longer treatments, lower viscosity solutions, lower molecular weight anthranyls, and relatively open solid structures, all tend to bring about complete substitution throughout the structure.

In order to more clearly disclose the products of the invention and the processes of their preparation, a number of specific examples will now be given. All parts are by weight unless otherwise designated. For convenience, the anthranyls which appear in the following examples are identified in Table I by structure. The numbers assigned to the anthranyls in Table I correspond to the example numbers in which they appear in U.S. Patent 3,357,977. All conform to the following structure:

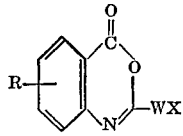

The symbol s[am]e indicates that WX is the same as that immediately preceding it except that the expression inside the brackets is repeated the number of times indicated.

In the first lot in this example the phenylene groups inside the brackets alternate as para and ortho phenylenes.
In the second lot the phenylene groups inside the brackets alternate as meta and ortho phenylenes.

TABLE I

| Compound No. | R is hydrogen except as follows: | WX |
|---|---|---|
| 1 | | CH₃ |
| 2 | | φ |
| 3 | R is Br | CH₃ |
| 4 | R is NO₂ | CH₃ |
| 5 | R is NO₂ | φ |
| 6 | | —(CH₂)₄CH₃ |
| 7 | | —(CH₂)₁₀CH₃ |
| 8 | | CF₃ |
| 9 | | ⌬—NHC(O)—(CF₂)₆CF₃ |
| 10 | | —(CF₂)₆CF₃ |
| 11 | | —CH₂—N(Et)—SO₂(CF₂)—CF₃ |
| 12 | | ⌬—[NHC(O)—⌬—]₁—NHSO₃φ |
| 13 | | s[am]e₂ |
| 14 | | s[am]e₃ |
| 15 | | ⌬—NHC(O)φ |
| 16 | | ⌬—[NHC(O)—⌬—]₂—H |
| 17 | | s[am]e₃ |
| 18 | | s[am]e₄ |
| 23 | | s[am]e₁₉ |
| 19 | | ⌬—CH₂—⌬—NHC(O)—φ |
| 20 | | ⌬—NO₂ |
| 21 | | ⌬—NH₂ |
| 22 | | ⌬—NO₂ |

Example 1

Reaction of acetylanthranyl and polyvinyl alcohol.

10 grams of high viscosity polyvinyl alcohol (Elvanol 72–51, more fully described hereinafter), 30 grams of acetylanthranyl and 250 cc. of N,N'-dimethylformamide are stirred together at 100–110° C., a homogeneous viscous solution being formed within approximately 10 minutes of reaching the reaction temperature. The solution is maintained at this temperature for approximately one hour, during which time the agitation is continued, and is then poured with vigorous agitation into a large excess of water. The solution forms a plastic precipitate which is allowed to settle and the aqueous layer is removed by decantation. The precipitate is then leached with hot aqueous sodium bicarbonate, the residue is collected by filtration, reslurried in water and the water is again removed by decantation. The wet polymer is added to an equal volume of acetone to form a clear, water white solution which is a thermolabile jel which is fluid at the boiling point of acetone and which is a solid gum at room temperature. Addition of more acetone causes the hot solution to coagulate but solution again occurs on evaporation of the acetone to the critical range for the ternary solution. The polymer is reprecipitated by dropwise addition of the hot viscous solution to a large excess of water. The resulting plastic precipitate gradually disintegrates to small particles by continued agitation in the water. These particles are allowed to settle over night, the supernatent water is separated by decantation and the remaining mass is squeezed dry then dried over night in a vacuum oven at 90° C. to yield 10 grams of polymer. The elementary analysis for nitrogen corresponds to a ratio of vinyl alcohol to acetylanthranyl units of 7.3 to 1 indicating that the average repeating unit is approximately as follows:

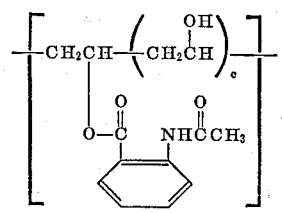

This conclusion is supported by the infrared spectrum of the sample.

This polymer is pressed into a clear white tough pliable film at a temperature of 200° C. and a ram pressure of 20,000 p.s.i. The tensile strength of this film is found to be $1.2 \times 10^4$ p.s.i., its tensile modulus 2.92 and its percent elongation at rupture 5–20 percent. The X-ray diffraction pattern of the precursor polyvinyl alcohol shows it to be a crystalline material while the polymer of this example is shown by the X-ray diffraction pattern to be non-crystalline.

In another preparation, 200 cc. of dimethylformamide, 20 grams of polyvinyl alcohol ("Elvanol" 72–51) and 2 grams of sodium methoxide are charged to a 500 milliliter three-necked round bottom reaction flask fitted with a stirrer. a nitrogen inlet tube, a dropping funnel and a thermometer. The mixture is warmed to 280° C. with stirring and maintained at that temperature for ½ hour during which time nitrogen is swept through the flask to eliminate methyl alcohol. 20 grams of acetylanthranyl dissolved in 50 cc. of dimethylformamide are then added dropwise to the rotating stirred suspension of polyvinyl alcohol in dimethylformamide over a period of about one hour. Swelling of the polyvinyl alcohol begins with the first addition of acetylanthranyl and swelling action is virtually complete before the last of the acetylanthranyl is added. The reaction mixture is maintained at 80° C. for two additional hours and then allowed to cool to about 25° C. and remain for approximately 17 hours without stirring. At the end of this time a small amount of insoluble polyvinyl alcohol is decanted from the mixture and remaining clear solution is poured dropwise into two liters of continuously agitated water. The polymer precipitates as a white fibrous rather sticky material that gradually loses its tacky feel with continued washing in the water. The polymer is leached with warm aqueous sodium bicarbonate and warm water, is dissolved in a solution of approximately 360 cc. of acetone and 40 cc. of water and finally is reprecipitated by the dropwise addition of two liters of water. The product is isolated by filtration, dried and weighed, a 31 gram sample being recovered (78 percent of the theoretical yield). This polymer contains 4.3 percent of nitrogen which corresponds to a ratio of vinyl alcohol units to acetylanthranyl side change units of 3.7 to 1 which is the exact ratio of these products charged to the reaction mixture.

The polymer is ground to 20 mesh particles and 1 gram samples are then pressed at about 200° C. and 10 ton total ram pressure into water white, pliable films. The tensile strength of films cut from the resulting film is found to be 14,900 lbs. per square inch with a 14 percent elongation at break. Narrow strips are also cut from these films and oriented by hand drawing to give tough fibers with tensile strengths of $20-30 \times 10^3$ p.s.i.

A sample of the polymer is heat molded into a 1″ plug which is then drilled, tapped and machined to a lathe to produce a cylinder about ½″ in diameter and ¾″ in length thus demonstrating the machineability of the product.

The polymeric product is also extruded to give fibers with strengths comparable to those of the films.

Unmodified polyvinyl alcohol cannot be pressed into films as above, the result being merely to char the polymer.

A number of samples of reaction products of acetylanthranyl and polyvinyl alcohol are prepared in which the type of polyvinyl alcohol used is modified as well as the charge ratio of the polyvinyl alcohol to acetylanthranyl. Three grades of white, powdered polyvinyl alcohol are used: high viscosity "Elvanol" 72–51, medium viscosity "Elvanol" 71–24 and low viscosity "Elvanol" 70–05, all available from E. I. du Pont de Nemours and Co., Inc. The various preparations are summarized in Table II. The procedure for the preparation of each of these lots is approximately the same as the polymerization procedure just described.

TABLE II

| Lot designation | Viscosity type, PVA | Charge ratio, PVA/AA[d] | Percent yield of product | Percent nitrogen in product | Ratio of PVA/AA in product[d] | η |
|---|---|---|---|---|---|---|
| A | Low[a] | 3.7/1 | | 3.9 | 5/1 | 1.2 |
| B | do[a] | 3.7/1 | 80 | 4.0 | 4.3/1 | 0.47 |
| C | Medium[a] | 3.7/1 | 85 | 4.0 | 4.3/1 | |
| D | Medium[b] | 3.7/1 | 95 | 4.2 | 3.9/1 | |
| E | do | 7.4/1 | 66 | 1.7 | 15/1 | 1.64 |
| F | do | 10/1 | 65 | 1.4 | 18/1 | |
| G | do | 15/1 | 59 | | | |
| H | High[a] | 0.92/1 | 70 | 6.9 | 1/1 | 0.79 |
| I | High[b] | 3.7/1 | 95 | 4.3 / 4.1 | 3.8/1 / 4.1/1 | 1.3 |
| J | High[b,c] | 3.7/1 | 79 | 3.5 | | |
| K | High[b] | 7.4/1 | 81 | 2.3 | 10/1 | 1.8 |
| L | do | 10/1 | 56 | 1.4 | 18/1 | 2.1 |
| M | do | 15/1 | 57 | 0.6 | 49/1 | |

[a] 10 grams of PVA used.
[b] 200 grams of PVA used.
[c] Dimethylsulfoxide solvent used in dimethylformamide.
[d] Mole ratio of polyvinyl alcohol to acetylanthranyl units.

It is noted that the solubility of these polymeric products in dimethylformamide increases with the increase in degree of acylation with acetylanthranyl. Thus, 200 grams of a product having a PVA to AA ratio of about 12/1 requires 24 hours to dissolve completely in 4 liters of dimethylformamide at 120° C. while 300 grams of a product with a PVA to AA ratio of about 4/1 dissolves completely within four hours in 2 liters of dimethylformamide at 80° C. Similarly, the sensitivity to water of the polymer decreases with the increase of the degree of acylation. Thus, a polymer with a PVA to AA ratio of about 4/1 precipitates as a fibrous material when injected as a 2 percent solution of polymer in dimethylformamide into a stream of water whereas the 12/1 product can only be recovered as a soft plastic mass by leaching out the dimethylformamide solvent with water.

Film samples are pressed from various of the above lots of polymers and evaluated as summarized in Table III.

TABLE III

| Lot designation | Elastic modulus ($10^5$ p.s.i.) | Tensile ($10^3$ p.s.i.) after heat elongation | Percent elongation at break |
|---|---|---|---|
| A | 2.5 | 11.1 | 30 |
| C | [a]2.1 | 9.1 | 10 |
| D | 2.4 | 9.9 | 20 |
| E | 3.3 | 22.7 | 20 |
| F | 3.9 | [b]24.2 | 20 |
| H | 2.0 | 8.3 | 10 |
| I | 2.3 | 9.0 | 20 |
|   | 2.6 | 12.7 | 20 |
| J | 3.6 | 15.6 | 20 |
| K | 3.1 | 17.1 | 15 |
| L | 3.6 | [b]26.1 | 20 |
| M | 3.6 | 17/1 | 30 |

[a] X-ray diffraction patterns indicate that pressed sample and heat oriented film therefrom are both amorphous.
[b] Sample rupture at jaw indicating that breaks started by mechanical cutting. X-ray diffraction indicates that these products are crystalline.

X-ray diffraction tests on these samples indicate that amorphous film strips having a PVA to AA ratio of about 18/1 become crystalline upon heat elongation while the same treatment has no such observable effect on polymers having a PVA/AA ratio of 4/1. In all cases, however, the flexibility and pliability of the polymer are moderately improved after heat elongation. The effect of such heat elongation on several of the lots of the foregoing tables is summarized in Table IV.

TABLE IV

| Lot designation | PVA viscosity | PVA/AA ratio | Tensile strength ($10^3$ p.s.i.) | |
|---|---|---|---|---|
| | | | Before orientation | After orientation |
| E | Medium | 15/1 | 9.7 | 22.7 |
| F | do | 18/1 | 10.7 | 24.2 |
| K | High | 10/1 | 9.0 | 17.1 |
| L | do | 18/1 | 9.8 | 26.1 |

Example 2

Reaction of benzoylanthranyl with polyvinyl alcohol.

50 grams of polyvinyl alcohol ("Elvanol" 72–51), and 8 grams of sodium methylate are slurried in 450 cc. of dimethylformamide contained in a 1 liter three necked flask fitted with a stirrer, a dropping funnel, a reflux condenser and a thermometer. The stirred slurry is warmed to 60° C. and a solution of 34 grams of benzoylanthranyl in 300 cc. of dimethylformamide is added dropwise. The mixture is heated to 120° C. and is allowed to react at that temperature for an additional 8 hours, the agitation being continued. The resulting homogeneous slightly green but clear solution is precipitated by pouring it into a 10 fold excess of cold water. The precipitate is collected by filtration, washed with water, with aqueous sodium bicarbonate and then again with fresh water. The product is dried ground to 20 mesh particle size. The yield is 89 percent of the theoretical amount (57 grams). It is found to contain 1.3 percent of nitrogen corresponding to a ratio of PVA to benzoylanthranyl units of 19/1.

This polymeric product is pressed at 400° F. and 25,000 p.s.i. ram pressure for 1 minute to give a clear, transparent, pliable film. The tensile strength of this film is 10,700 lbs. per square inch and the tensile is raised to 23,100 lbs. per square inch by heat orientation. The elastic modulus of the oriented film is $6.1 \times 10^5$ p.s.i. and the percent elongation at break is 10.

The characteristics of several other polymers produced by the reaction of the three grades of polyvinyl alcohol ("Elvanol" 72–51, 71–24 and 70–05) with benzoylanthranyl are summarized in Table V, the ratio of polyvinyl alcohol to benzoylanthranyl units being on a molar basis.

TABLE V

| Viscosity type PVA | Ratio PVA/BA in prod. | Elastic modulus $10^5$ p.s.i. | Tensile (p.s.i.) $10^3$ after heat elongation | Percent elong. |
|---|---|---|---|---|
| High | 5/1 | 2.0 | 9.73 | 43 |
| Do | 10/1 | 2.7 | 24.0 | 40 |
| Do | 19/1 | 4.2 | 26.4 | 20 |
| Low | 5/1 | 2.3 | 8.05 | 6 |
| Do | 15/1 | 2.5 | 6.2 | 8 |
| Do | 25/1 | 2.8 | 8.04 | 7 |
| Med | | 1.9 | 8.43 | 15 |

Example 3

Reaction of acetylanthranyl with cellulose acetates.

One gram of acetylanthranyl in 1 cc. of pyridine is added to 20 cc. of a 10 percent cellulose acetate solution in acetone contained in 50 cc. Erlenmeyer flask. The cellulose acetate used in preparing the foregoing solution is a high molecular weight film material. This solution is allowed to remain at room temperature for two days. At the end of this time the solution is placed on a steam bath and the acetone is removed by evaporation. After bubble formation has ceased, the viscous residue is redissolved in 20 cc. of acetone and the resulting solution is added dropwise to 400 cc. of water with continuous agitation. This product precipitates in the water as a very fine fibrous material which resembles cotton or glass-wool dispersed in water. Samples of this dispersion are separated by filtration to obtain continuous sheets of nonwoven fabric material resembling paper. By contrast, unmodified cellulose acetate is obtained simply as a taffy-like mass when reprecipitated under the same conditons. Elementary analysis of this polymeric product indicates a 1.4 percent nitrogen content. The infrared spectrum of the polymer indicates the presence of acetylanthranyl groups in the cellulose acetate.

Example 4

Reaction of benzoylanthranyl with cellulose acetate.

A solution of benzoylanthranyl (10 g.) in acetone (50 cc.) is added dropwise to a rotating mixture of cellulose acetate (20 g.) pyridine (20 cc.), NaOCH$_3$ (2 g.) and acetone (200 cc.) contained in a 500 cc. three necked round bottom flask fitted with a stirrer, dropping funnel, thermometer and reflux condenser. The reaction is carried out at reflux temperature for 8 hours while protected from oxygen by an atmosphere of nitrogen. A clear solution is obtained. The product is recovered in 90% yield by dropwise addition to large excess of water and is then leached with aqueous NaHCO$_3$ and again with water and air dried.

The polymer is pressed at 200° C. and 2000 lbs. ram pressure into tough, flexible films that can be heat oriented to give crystalline flexible films wtih tensile strengths in excess of $2.5 \times 10^4$ p.s.i. Films are also cast from solutions. Rods and other large objects are prepared by injection molding. These specimens can be drilled and tapped, and machine shaped on a lathe.

Example 5

Reactions of o-perfluorooctanamidobenzoylanthranyl, perfluorooctanoylanthranyl and N-ethyl-n-perfluorooctylsulfonamidoacetylanthranyl with cotton cloth and paper.

The cloth and paper are first boiled briefly in a solution of sodium methoxide in methyl alcohol and are then treated in a solution of the anthranyl in benzene. The lots are as follows:

TABLE VI

| Lot | Anthrayl WX = | Polymer |
|---|---|---|
| A | ⌬—NHCC$_7$F$_{15}$ (O) | Cotton cloth. |
| B | ⌬—NHCC$_7$F$_{15}$ (O) | Filter paper. |
| C | —C$_7$F$_{15}$ | Cotton cloth. |
| D | —CH$_2$NEtSO$_2$C$_8$F$_{17}$ | Do. |

The resulting treated cloth and paper are found to repel water. The treated samples of lots A and C are further tested by agitating them in a washing machine in hot water. They are found to retain their water repellency through this cycle.

Example 6

Reaction of longer chain polybenzamidobenzoylanthranyls with polyvinyl alcohol.

A mixture of N-methylpyrrolidinone (35 cc.), polyvinyl alcohol (1 g.) and sodium methoxide (0.1 g.) is allowed to react at 60° for 1 hour in a 100 cc. round bottom flask fitted with a stirrer and a nitrogen sweep. The telomeric product (1 g.) of p-aminobenzoylanthranyl and benzoic anhydride of Example 23 of U.S. Patent 3,357,977 in N-methylpyrrolidinone (35 cc.) is added to this mixture and reaction is allowed to occur overnight at 80–100° C. to afford a homogeneous viscous solution. The modified polyvinyl alcohol is precipitated by dropwise addition to water. The product is isolated in 90% of theory. The infrared spectrum of this material confirms that esterification has occurred to give the expected modified polyvinyl alcohol with pendant polyamide chains.

Similar results are obtained when polyvinyl alcohol is modified by reaction with the corresponding telomer of m-aminobenzoylanthranyl and benzoic anhydride.

A solution of linear-poly-o-benzamido benzoylanthranyl (5 g.; average molecular weight=1400 which corresponds to about 10 benzamido units) in dimethyl sulfoxide (50 cc.) is added dropwise to a rotating mixture of polyvinyl alcohol (25 g.), NaOCH₃ (3 g.) and dimethyl sulfoxide (200 cc.) contained in a 500 cc. three necked round bottom flask fitted with a stirrer, dropping funnel, thermometer and reflux condenser. The reaction is carried out at 100° C. for 8 hours while protected from oxygen by an atmosphere of nitrogen. A clear solution is obtained. The product is recovered in 85% yield by dropwise addition to large excess of water. The product is leached with aqueous NaHCO₃ and again wtih water and air dried.

The polymer is pressed at 200° C. and 2000 lbs. ram pressure into tough flexible films that can be heat oriented to give crystalline flexible films with tensile strengths in excess of $2.5 \times 10^4$ p.s.i. Films are also cast from solution. Rods and other large objects are prepared by injection molding. These specimens can be drilled and tapped, and machine shaped on a lathe.

In another lot, a weight ratio of the polyvinyl alcohol to the same anthranyl of 10/1 is used. The procedure is repeated except that the solvent is removed by vacuum distillation. The residue is extracted with hot water. The aqueous solution of the product, weight ratio 20/1, is a high temperature gel that is liquid at about 100° C. but, solid at about 80° C. This product can be used in a microbe-resistant photographic emulsion.

Table VII summarizes a number of examples relating to the preparation of polymers of the invention from polyvinyl alcohol and a number of anthranyls. In each case a solution of the anthranyl in 50 cc. of a solvent (either dimethyl formamide or dimethylsulfoxide) is added dropwise to a stirred mixture of polyvinyl alcohol, sodium methoxide and 200 cc. of the same solvent in a 500 cc. three necked round bottom flask fitted with a stirrer, a dropping funnel, a thermometer and a reflux condenser. The times and temperatures of the reactions are indicated in the table. In each case the mixture is stirred during the reaction, which is carried out in an atmosphere of nitrogen. "Elvanol" 71–24 is the polyvinyl alcohol used in these examples.

Clear solutions of the polymeric products are obtained in each case. They are recovered by dropwise addition of this solution to a large excess of water, leaching the resulting coagulated polymers with aqueous sodium bicarbonate and water and then air drying them.

Each of the resulting polymers is pressed at 200° C. and 2000 lbs. ram pressure into a tough, flexible film that can be heat oriented to give crystalline flexible films with tensile strengths in excess of $2.5 \times 10^4$ p.s.i. Films are also cast from solution. Rods and other large objects of these polymers can be prepared by injection molding, and these objects can be drilled and tapped, and machine shaped on a lathe.

TABLE VII

| Ex. No. | Anthranyl Compound No.[4] | Anthranyl Amount (gms.) | PVA (gms.) | NaOCH₃ (gms.) | Solvent | Reaction Time (hrs.) | Reaction Temp. °C. | Yield Percent |
|---|---|---|---|---|---|---|---|---|
| 7 | 3 | 10 | 50 | 2 | DMF | 8 | 100 | 95 |
| 8 | 4 | 10 | 20 | 2 | DMF | 6 | 100 | 90 |
| 9 | 5 | 10 | 20 | 2 | DMS | 8 | 80 | 90 |
| 10 | 6 | 10 | 20 | 2 | DMS | 8 | 80 | 95 |
| 11 | 7 | 15 | 20 | 2 | DMF | 6 | 110 | 92 |
| 12 | 8 | 20 | 20 | 2 | DMS | 5 | 90 | [1] 95 |
| 13 | 9 | 10 | 20 | 2 | DMS | 6 | 90 | 90 |
| 14 | 10 | 10 | 20 | 2 | DMF | 8 | 110 | [2] 92 |
| 15 | 11 | 10 | 25 | 2 | DNF | 8 | 110 | [2] 95 |
| 16 | 12 | 10 | 25 | 4 | DMS | 6 | 90 | 88 |
| 17 | 13 | 10 | 25 | 4 | DMS | 6 | 90 | 90 |
| 18 | 14 | 10 | 25 | 4 | DMS | 7 | 90 | 90 |
| 19 | 15 | 10 | 20 | 2 | DMF | 7 | 110 | 90 |
| 20 | 16 | 5 | 25 | 2 | DMS | 6 | 90 | 90 |
| 21 | 17 | 5 | 25 | 2 | DMF | 8 | 110 | 85 |
| 22 | 19 | 5 | 20 | 2 | DMF | 6 | 110 | 85 |
| 23 | 21 | 10 | 20 | 2 | DMS | [3] 8 | 100 | 90 |

[1] Extruded specimens made from this polymer resist wetting by water despite a large excess of free OH radicals therein.
[2] Extruded specimens are resistant to wetting by water.
[3] Two reactions occur simultaneously: the homopolymerization of p-aminobenzoylanthranyl and esterification of the polyvinyl alcohol. The final product is polyvinyl alcohol with side chains of polybenzamido groups.
[4] Correspond to the numbers in Table I.

What is claimed is:
1. Solid polymers consisting essentially of
   I. main chains selected from the class consisting of
      (1) carbon chains and
      (2) carbon chains containing recurring ether oxygen atoms and said polymers having
   II. recurring side groups selected from the class consisting of hydroxyl, acetate and carboxy-linked anthranylic groups, provided that the polymer does not contain both hydroxyl and acetate groups; the said anthranylic groups comprising not less than about 5 weight percent of the polymer and being of the general structure:

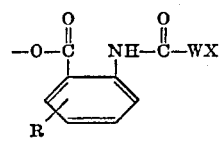

wherein W is $(CH_2)_q$,

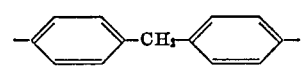

or phenylene; X is

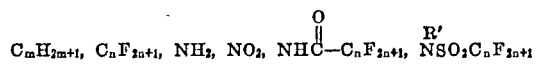

or

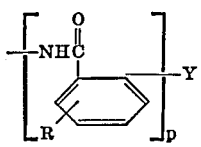

Y is hydrogen or

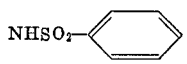

R' is hydrogen or an alkyl group containing up to 6 carbon atoms; R is hydrogen, nitro or halogen; and $m$ is 0–18, $n$ is 1–12, $p$ is 1–20 and $q$ is 0–18, provided that $m+q$ is not greater than 18.

2. A solid polymer according to claim 1 wherein the main chain consists of carbon atoms.

3. A solid polymer according to claim 1 wherein the main chain consists of carbon atoms and recurring ether oxygen atoms.

4. A solid polymer according to claim 1 having o-acetamidobenzoate side groups.

5. A solid polymer according to claim 1 having o-benzamidobenzoate side groups.

6. A solid polymer according to claim 1 having anthranylic side groups which are terminated with the group $C_nF_{2n+1}$ wherein $n$ is 1–12.

7. A solid polymer according to claim 1 having anthranylic side groups of the formula:

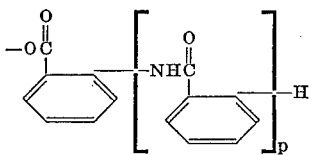

wherein $p$ is 1–20.

8. A solid polymer according to claim 1 having anthranylic side groups of the formula:

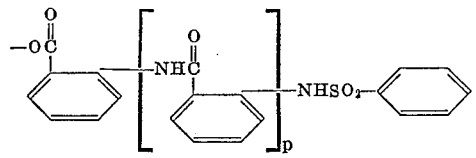

wherein $p$ is 1–20.

9. The process of preparing polymers having
 I. main chains selected from the class consisting of
   (1) carbon chains and
   (2) carbon chains containing recurring ether oxygen atoms and having
 II. recurring side groups selected from the class consisting of hydroxyl, acetate and carboxyl-linked anthranylic groups, provided that the polymer does not contain both hydroxyl and acetate groups; the said anthranylic groups comprising not less than about 5 weight percent of the polymer and being of the general structure:

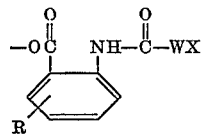

wherein W is $(CH_2)_q$

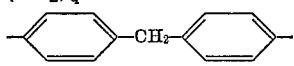

or phenylene; X is

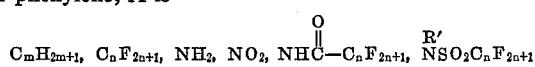

or

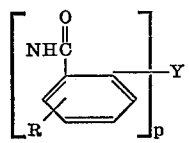

Y is hydrogen or

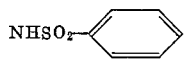

R' is hydrogen or an alkyl group containing up to 6 carbon atoms; R is hydrogen, nitro or halogen; and $m$ is 0–18, $n$ is 1–12, $p$ is 1–20 and $q$ is 0–18, provided that $m+q$ is not greater than 18 which comprises interreacting at 60–150° C. and in the presence of from about 0.05 to 1.0 moles of alkali metal lower alkoxide, (A) an anthranyl of the formula

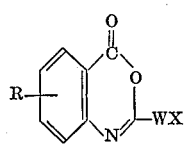

wherein R, W and X have the above meanings, in a solvent free from reactive hydrogen and (B) a precursor polymer having main chains selected from the class consisting of
   (1) carbon chains and
   (2) carbon chains interrupted by recurring ether oxygen atoms and said precursor polymer having recurring side groups selected from the class consisting of hydroxyl and acetate groups, provided that the polymer does not contain both hydroxyl and acetate groups; and recovering the desired polymer.

10. The process according to claim 9 wherein the anthranylic side groups are terminated with the group $C_nF_{2n+1}$ wherein $n$ is 1–12.

11. The process according to claim 9 wherein the anthranylic side groups have the formula:

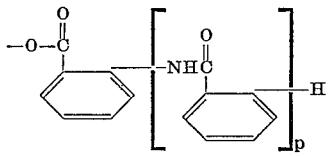

wherein $p$ is 1–20.

12. The process according to claim 9 wherein the anthranylic side groups have the formula:

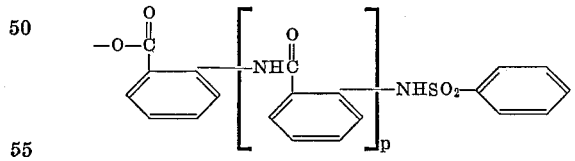

wherein $p$ is 1–20.

References Cited
UNITED STATES PATENTS

| | | | |
|---|---|---|---|
| 2,728,745 | 12/1955 | Smith et al. | 260—91.3 |
| 2,831,831 | 4/1958 | Caldwell et al. | 260—79.3 |
| 2,847,461 | 8/1958 | Lecher et al. | |

WILLIAM H. SHORT, *Primary Examiner.*

H. D. ANDERSON, *Assistant Examiner.*

U.S. Cl. X.R.

260—91.3, 230, 79.3, 2, 9, 13, 87.3, 88.1, 6, 30.8, 32.6; 117—161

U.S. DEPARTMENT OF COMMERCE

PATENT OFFICE

Washington, D.C. 20231

UNITED STATES PATENT OFFICE
CERTIFICATE OF CORRECTION

Patent No. 3,440,228            April 22, 1969

Louis A. Errede

It is certified that error appears in the above identified patent and that said Letters Patent are hereby corrected as shown below:

Column 5, line 10, compound 7, "$-(CH_2)_{10}$" should read -- $-(CH_2)_{16}$ --; line 19, compound 11, "$(CF_2)-CF_3$" should read -- $(CF_2)_7 CF_3$ --. Column 8, line 38, footnote C, "Dimethylsulfoxide solvent used in dimethylformamide." should read -- Dimethylsulfoxide solvent used in place of dimethylformamide. --. Column 10, line 48, "Anthrayl WX=" should read -- Anthranyl WX= --.

Signed and sealed this 31st day of March 1970.

(SEAL)
Attest:

Edward M. Fletcher, Jr.            WILLIAM E. SCHUYLER, JR.
Attesting Officer                  Commissioner of Patents